Aug. 14, 1934.   H. R. BEARD   1,969,833
APPARATUS FOR TREATING FOODSTUFFS
Original Filed Feb. 6, 1930   4 Sheets-Sheet 4
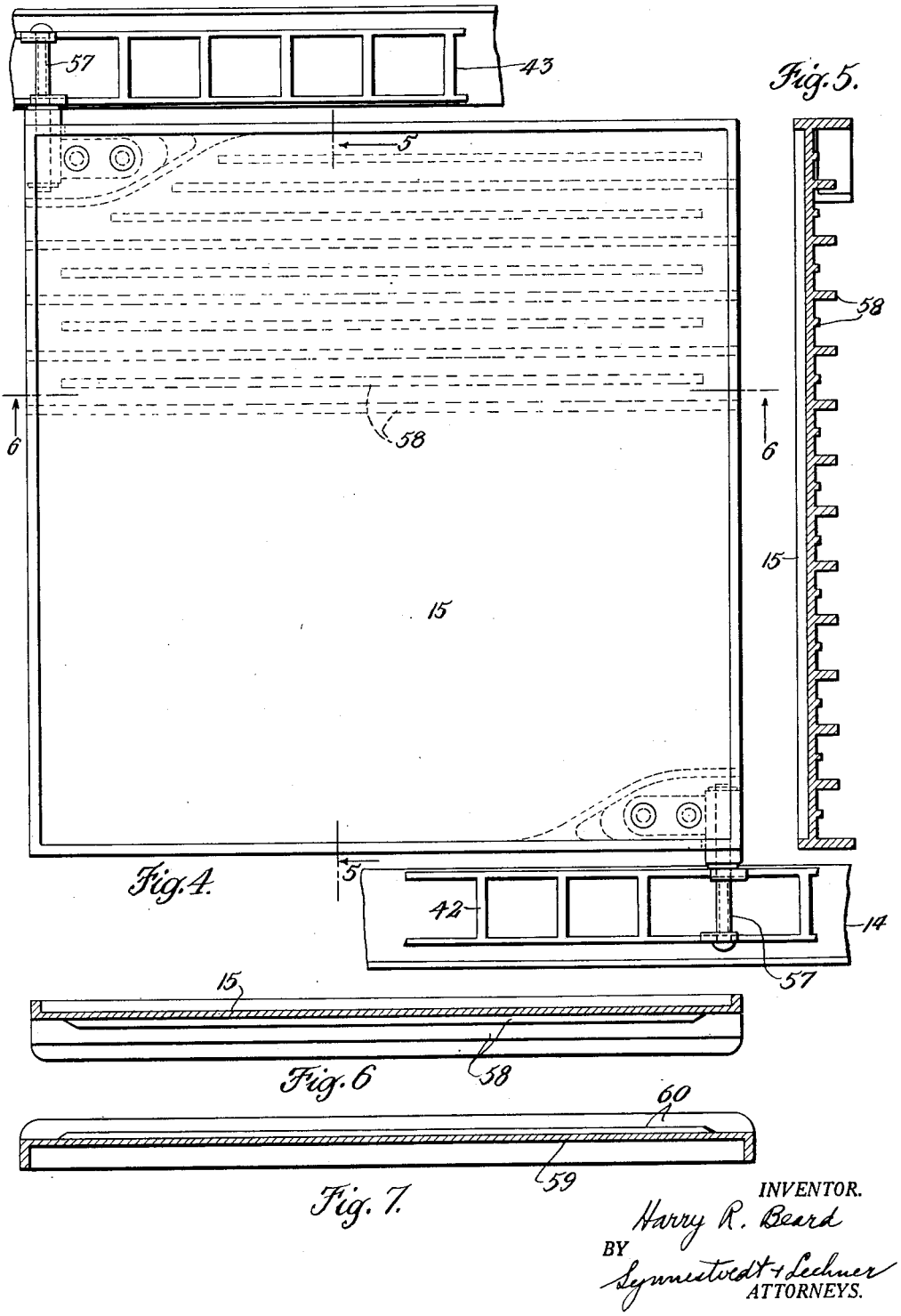
INVENTOR.
Harry R. Beard
BY
Lynnestvedt + Lechner
ATTORNEYS.

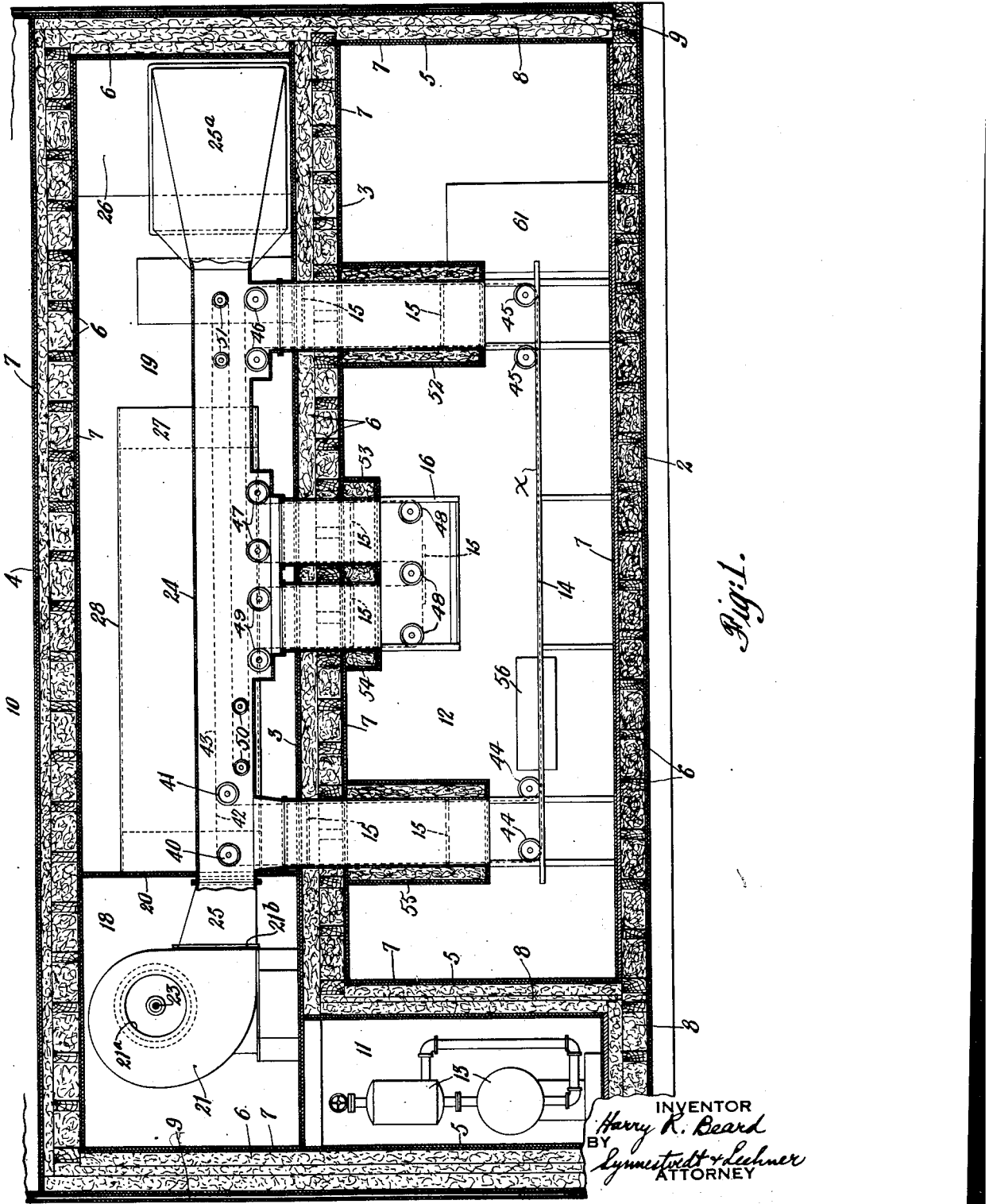

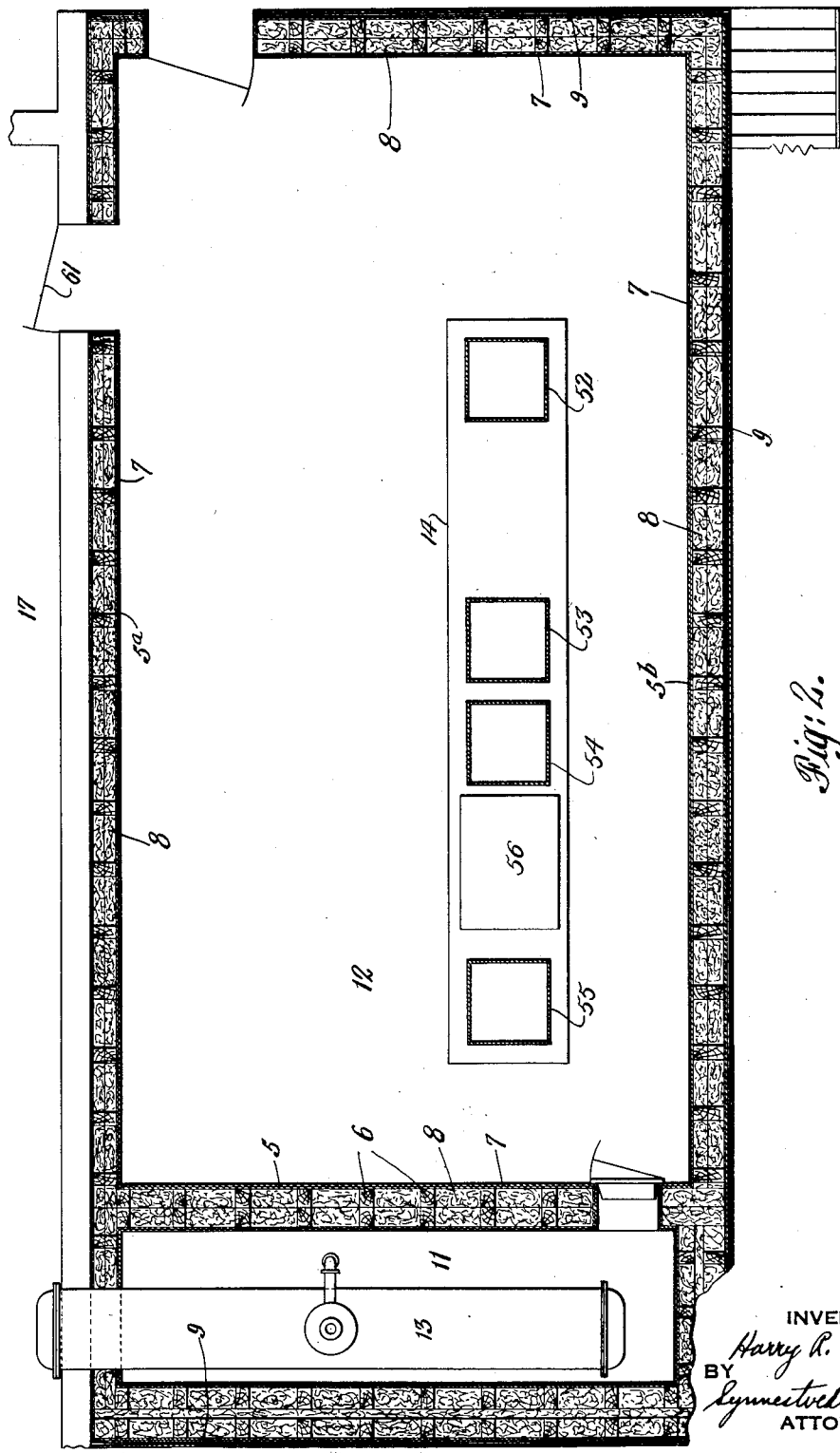

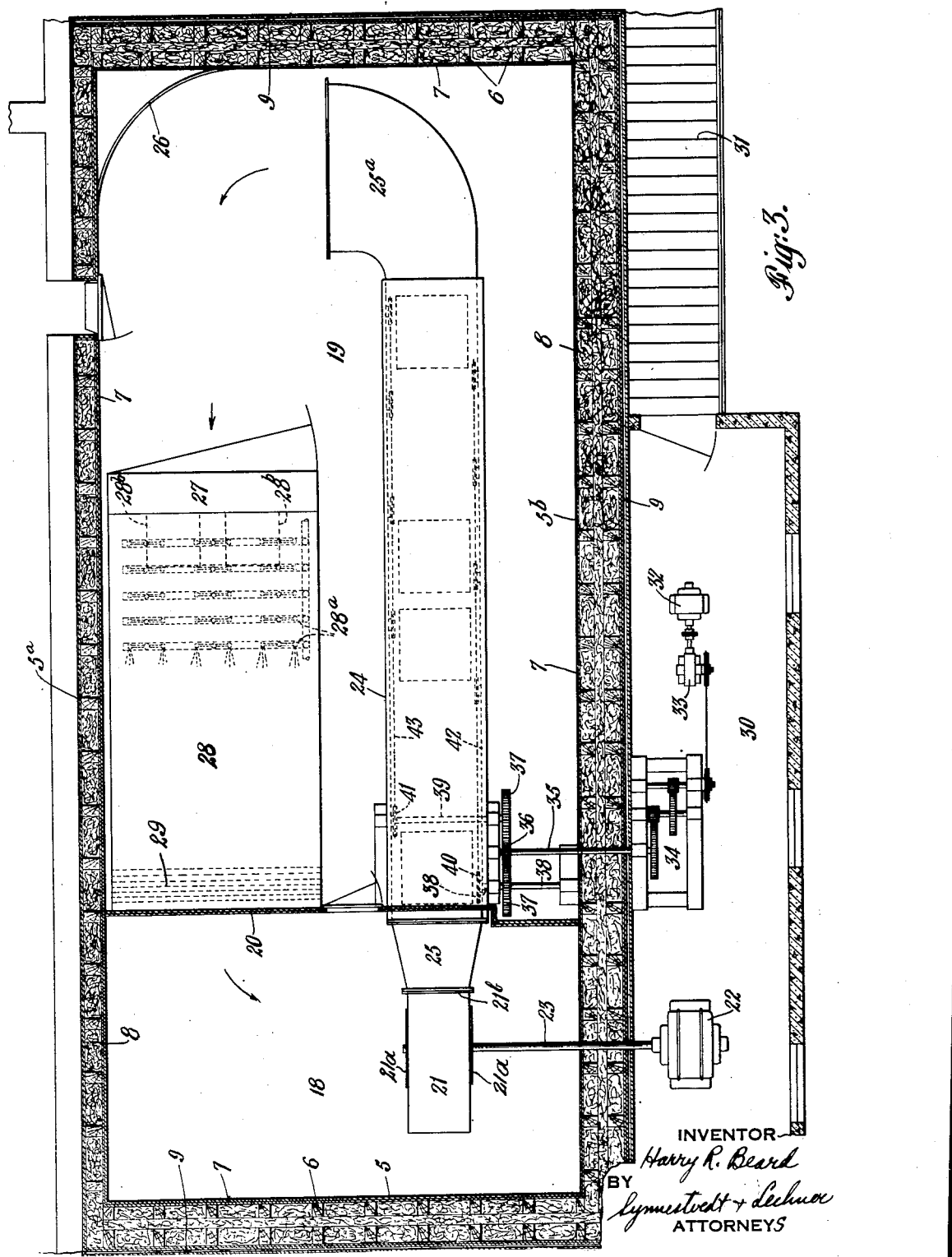

Patented Aug. 14, 1934

1,969,833

UNITED STATES PATENT OFFICE 1,969,833

APPARATUS FOR TREATING FOODSTUFFS

Harry R. Beard, Vancouver, British Columbia, Canada, assignor to New England Fish Company, Boston, Mass., a corporation of Maine Application February 6, 1930, Serial No. 426,206
Renewed September 21, 1933

30 Claims. (Cl. 62—104)

This invention relates to apparatus for treating foodstuffs, particularly apparatus for freezing or chilling foods, such as fish or other meats; and, while it may be effectively applied to the carrying out of various methods of chilling or freezing fish and other articles of food, it is especially useful as providing a convenient and economical means for carrying on the continuous fish-freezing process disclosed in my copending application, Serial No. 354,445, filed April 11, 1929, and entitled "Preservation of foods". In addition the invention contemplates a unitary and compact apparatus by which may be carried on, in a more or less combined form, my aforementioned freezing method and the freezing method disclosed in another of my co-pending applications, Serial No. 354,446, filed April 11, 1929.

One of the primary objects of the present invention is to improve the freezing or chilling of foodstuffs, particularly the freezing of fish by cold air methods; and in so doing, to minimize manual handling; cut down cold air losses; decrease the space required by, and the size and cost of, the freezing plant; shorten the time necessary for freezing; and in general to provide a plant with a continuous arrangement of elements capable of carrying on continuous freezing methods, although flexible as to control of temperature, rate of freezing, etc.

More particularly, the invention contemplates the provision, in a compact plant, of means for effecting a continuous flow or circulation of a gaseous freezing medium, regulable as to speed, temperature and humidity; means for effecting a continuous insertion into, carriage through, and delivery out of the freezing medium of a series of foodstuff containers, at regulable speed; means for utilizing the conveying means itself to prevent losses of the refrigerating medium; means for improvement of heat transfer from the articles being frozen to the freezing medium; means for conveniently and effectively glazing the articles at the proper points in the freezing process and afterwards; means for preventing transfer of heat from the operating machinery to the refrigerating chambers; and means of ready access to all parts of the machinery and to the several divisions of the plant without interference with the handling of the frozen and unfrozen articles.

More specifically, the invention involves, in its present preferred embodiment, the provision of an apparatus or plant of the character described, in which:

There is a convenient division of the space into upper and lower floors (insulated from each other), each floor being divided into chambers for purposes hereinafter appearing;

An apparatus is arranged, preferably upon an upper floor, effecting a closed-circuit flow of air from a blower through a freezing tunnel or chamber, from thence to a diffuser, a cold-brine spray-chamber, and a brine separator or eliminator and thence back to the blower.

A handling and conveying system, working also in an endless circuit (which is, in general, in a plane perpendicular to the horizontal circuit of the freezing medium), extends lengthwise of a chamber of the lower floor, then runs upwardly into the freezing duct, makes one or more passes therein, in the course of which it passes downwardly and upwardly into and out of an intermediate glazing room or chamber, and then finally runs downwardly into the main or working room of the lower floor.

A supplemental glazing or final packing room is provided laterally of the work room; a brine-cooling machine is located on the bottom floor toward one end of the work room and separated therefrom by an insulated wall, the blower being mounted thereabove for support by said wall; and a separate machinery room is provided, laterally of the freezing room, with separate means of access, and having power means for driving both of said continuous systems, i. e. the freezing and conveying systems.

In addition to the foregoing, the invention involves certain novel details of construction of the freezing and conveying systems, and of the trays of the conveying system, which co-operate to attain the primary objects, as will hereinafter appear.

How I attain the foregoing objects and advantages, and such others as are incident to the invention or as will occur to those skilled in the art, will be evident from the following description, reference being had to the accompanying drawings, which illustrate one embodiment of the invention, and in which:

Figure 1 is a fragmentary, longitudinal, vertical sectional view of a freezing plant or apparatus embodying the invention;

Figure 2 is a plan view, partly in section, of the first or lower floor of the plant;

Figure 3 is a similar view of the second or upper floor thereof;

Figure 4 is a plan view of part of the conveying mechanism, including a tray thereof;

Figure 5 is a section on the line 5—5 of Fig. 4;

Figure 6 is a section on the line 6—6 of Fig. 5; and

Figure 7 is a sectional view, corresponding to Fig. 6, of a lid which may be employed in conjunction with the tray or container of Figs. 4 to 6.

Referring first to Fig. 1, it will be seen that I have illustrated a freezing plant having a ground floor 2, a second floor 3, a ceiling 4, and walls 5, which may be built up with joists or studs 6 covered with double boarding 7, and all of which are heavily insulated, as by having the spaces between studs filled with dry shavings or other available heat insulating material 8. The outer walls may additionally have air-spaces 9, and above the second-floor ceiling I prefer to leave an air-space 10, covered by any suitable sloping roof (not shown).

The lower floor (see Figs. 1 and 2) I divide into two main rooms or chambers 11 and 12; in the first of which is located a brine cooler, indicated generally by the numeral 13 (which may be of any suitable available type needing no description here, as it is not per se a part of my invention); and in the second of which is a frame 14, along which the containers 15 (later to be referred to) travel, while operators remove frozen articles therefrom, and place thereon articles to be frozen. This room or chamber 12 also preferably contains within it a separate chamber 16, which I have termed a glazing chamber, although, alternatively, glazing (later to be described) may be done in a separate room 17 (Fig. 2), behind wall 5a. However, I prefer to provide both chamber 16 and room 17, for reasons which will hereinafter appear.

The upper floor (see Figs. 1 and 3) has also two main rooms 18 and 19, divided by a partition wall 20; in the first of which is a high-speed, large-capacity blower 21, having axial inlet 21a and peripheral discharge outlet 21b. This blower, it will be seen, as well as its variable-speed driving motor 22, which are interconnected by shaft 23, is mounted in vertical alinement with the partition wall 5 dividing first-floor rooms 11 and 12, so that a portion of the heavy weight of the machinery may be supported by such wall. In the other room, 19, is located the freezing duct 24, which extends through partition 20 for connection by the throat-piece 25 with the blower. At the opposite end of the duct, it has a curved expansion section 25a, directing the air-stream against the deflector 26, which in turn directs it toward the diffuser 27. The diffuser 27 really forms the entrance to an enclosed passage or chamber 28, which is a brine-spray air cooling chamber. The air, here sprayed by the cold brine jets from pipes 28a, then passes through any suitable brine eliminator or separator, indicated at 29, into room 18, to the blower intake.

It will, of course be understood that the brine cooler 13 (Fig. 1) is suitably connected by the usual piping (not shown) to the jet pipes 28a, and that the strainers, indicated at 28b (Fig. 3), located in the bottom of chamber 28 are connected by suitable gravity return pipes (not shown) to the cooler 13.

Motor 22 is located in a separate motor room 30, as will be seen from Fig. 3, which juts out beyond the side wall 5b; and in this room (which is reached by an outside stairway 31) is located also the power plant for the conveyors, consisting of a motor 32, a worm reduction gear 33 (of ratio about 48 to 1), suitable reducing gearing 34 and shaft 35.

Adjacent freezing conduit 24 is pinion 36 on shaft 35, which drives gears 37, 37 on shafts 38, 39, carrying sprockets 40, 41. These, in turn, drive the endless chains or belts 42 and 43.

The chains 42, 43, carrying at regularly spaced intervals the containers or trays 15, travel around pulleys or sprockets 44, 45, 46, 47, 48, 49, 50 and 51 (back to original drive-sprockets 40 and 41), so that each tray 15, in its circuit, travels from a zone indicated at x (where the treated articles are removed and fresh articles placed on the tray) along the frame or bench 14 toward the right (in Fig. 1), upwardly through insulated air-lock 52 into duct 24, to the left in said duct for a short distance, downwardly through lock 53, horizontally in glazing chamber 16 (where by hand, or by suitable automatic sprayers, not shown, an ice glaze is applied to the articles to obviate the possibility of desiccation), upwardly through lock 54 into duct 24 again, then back and forth for several passes in said duct (exposed to the high speed blast of the blower), and finally downwardly through lock 55 to the heating table or other warming device 56 for facilitation of the removal of the frozen articles.

The spacing of the containers 15 on the conveyor chains is preferably such that at least one container will always be in each of the locks or shafts 53, 54 to provide an air seal between duct 24 and chamber 16, and that at least two containers will always be in each of the locks 52, 55 to serve as an air seal between said duct 24 and the working-room 12. In general, it will therefore be seen, there is a continuous circuit of the freezing air in a horizontal plane on the upper floor, and there is a continuous circuit of the conveyor system, in a general vertical plane, into and out of the freezing circuit and through the fish-handling, fish-glazing, and tray-warming zones; and this with minimum loss of refrigerant and with practically no transfer of heat thereto from the operating machinery.

In the showing of Fig. 2, which illustrates the walls and the locks 52, 53, 54 and 55 in section, I have omitted, for the sake of clarity, certain parts: such as the insulation of said locks, the chamber 16, and the conveying chains, etc. The mounting of the trays 15, however, on the chains, is illustrated in Fig. 4, where I have shown a tray, mounted, as by lugs 57, on chains 42, 43, in its passage over the work-frame or table 14. From Figs. 4 to 6, it will be seen that the trays are preferably flat on top, for close contact with the fish (particularly useful where slices or steaks are being treated), while on the bottom they are provided with longitudinally extending cooling fins 58 to facilitate heat transfer to the longitudinally-flowing air-stream. Lids 59, provided with fins 60, may also be employed to cover the trays, where it is especially desirable to keep the surface of cut fish out of contact with the air stream, the lids being arranged to lie on top of the fish, in contact therewith for rapid heat transfer, and being readily liftable therefrom after the trays have passed the warmer 56.

It will be observed that the trays 15 (which may be made of aluminum, for rapid heat transfer as well as lightness) are always carried by the conveying system in a horizontal position, so that they automatically assume the proper position to serve as air locks in the vertical shafts, and so that the air flow is always lengthwise along the heat-transferring fins when the trays are in duct 24. Whether or not the fish are glazed with ice in the preliminary glazing chamber 16 (which is preferably done after a short run in the freezing duct 24, as shown), I prefer to provide also the final glazing and packing room 17, which is conveniently accessible through door 61, from the working space, indicated at x, along the bench 14.

From the foregoing it will be clear that I have attained the advantages and objects hereinabove stated in a simple and effective manner, by an apparatus which is at once compact and yet convenient of access in all its parts, and that the mechanism is well adapted to carrying out air-freezing or chilling, and glazing, methods, such as set forth in my aforementioned pending applications.

I claim:—

1. Apparatus for treating foodstuffs, including means for setting up a continuous closed circuit of a gaseous refrigerant, and a continuous foodstuff conveyor means running in a closed circuit a portion of which passes through the first-mentioned circuit, elements of said conveyor serving as seal means to prevent loss of the refrigerant.

2. In apparatus of the character described, a building structure having a plurality of floors, a chilling system on one of said floors, a handling system on another, and means for passing articles to be treated in a continuous series from the latter floor to the former and back, said means serving also to prevent intercommunication therebetween.

3. In apparatus of the character described, a building structure having a plurality of floors, a closed-circuit chilling system on one of said floors, a handling system on another incorporated as part of a closed-circuit conveying system for articles to be treated, and said conveying system, the circuit of the latter extending into the circuit of the chilling system and making a plurality of passes therein.

4. In apparatus of the character described, a building structure having a plurality of floors, a closed-circuit chilling system on one of said floors, a handling system on another incorporated as part of a closed-circuit conveying system for articles to be treated, and said conveying system, the circuit of the latter extending into the circuit of the chilling system and making a plurality of passes therein, together with a warmer for the conveyor at its exit from the chilling system.

5. In apparatus of the character described, a building structure having a plurality of floors, a closed-circuit chilling system on one of said floors, a handling system on another incorporated as part of a closed-circuit conveying system for articles to be treated, and said conveying system, the circuit of the latter extending into the circuit of the chilling system and making a plurality of passes therein, together with a glazing chamber, and an extension of the conveying system into said chamber.

6. In apparatus of the character described, a building structure having a plurality of floors, a closed-circuit chilling system on one of said floors, a handling system on another incorporated as part of a closed-circuit conveying system for articles to be treated, and said conveying system, the circuit of the latter extending into the circuit of the chilling system and making a plurality of passes therein, together with a glazing chamber, and an extension of the conveying system into said chamber intermediate said passes.

7. In apparatus of the character described, a closed circuit cold-air freezing system, including a high-speed blower, a freezing tunnel and an air-chilling zone; and a closed-circuit foodstuff conveyor system passing into and out of said tunnel, together with a glazing chamber through which the conveyor system passes.

8. In apparatus of the character described, a closed circuit cold-air freezing system, including a high-speed blower, a freezing tunnel and an air-chilling zone; and a closed-circuit foodstuff conveyor system passing into and out of said tunnel, together with a glazing chamber through which the conveyor system passes, intermediate the ends of said tunnel.

9. In apparatus of the character described, a closed circuit cold-air freezing system, including a high-speed blower, a freezing tunnel and an air-chilling zone; and a closed-circuit foodstuff conveyor system passing into and out of said tunnel, together with a glazing chamber through which the conveyor system passes, intermediate the ends of said tunnel, said glazing chamber being separate from said tunnel, and said conveyor system preventing escape of the air-current from the tunnel to the chamber.

10. In apparatus of the character described, a closed circuit cold-air freezing system, including a high-speed blower, a freezing tunnel and an air-chilling zone, locks opening transversely into said tunnel, and food-stuff containers with means for conveying them into and out of said tunnel through said locks.

11. In apparatus of the character described, a closed circuit cold-air freezing system, including a high-speed blower, a freezing tunnel and an air-chilling zone, locks opening transversely into said tunnel, and foodstuff containers with means for conveying them into and out of said tunnel through said locks into a constantly horizontal position.

12. In apparatus of the character described, a closed circuit cold-air freezing system, including a high-speed blower, a freezing tunnel and an air-chilling zone, locks opening transversely into said tunnel, and foodstuff containers with means for conveying them into and out of said tunnel through said locks, said containers fitting into the locks to block the escape of air through said locks.

13. In apparatus of the character described, a closed circuit cold-air freezing system, including a high-speed blower, a freezing tunnel and an air-chilling zone, locks opening into said tunnel, and foodstuff containers with means for conveying them into and out of said tunnel through said locks, said containers having radiating fins.

14. In apparatus of the character described, a closed circuit cold-air freezing system, including a high-speed blower, a freezing tunnel and an air-chilling zone, locks opening into said tunnel, and foodstuff containers with means for conveying them into and out of said tunnel through said locks, said containers having radiating fins extending in a direction lengthwise of the tunnel.

15. Apparatus for treating foodstuffs, comprising, in combination, means for refrigerating a gaseous medium, means for setting up a rapidly flowing current of the refrigerated medium, including fan mechanism with a casing structure having an air-outlet, means providing an enclosed zone of restricted cross-sectional area approximating that of the fan-casing air-outlet, through which zone said current is passed and whereby a high air velocity is maintained, and means for moving bulky or irregular articles to be treated into and out of said zone.

16. Apparatus for treating foodstuffs, including, in combination, means for refrigerating a gaseous medium, means for setting up a closed-circuit flow of the refrigerated medium, means providing an enclosed elongated tunnel, of restricted cross-sectional area as compared with other parts of the circuit, through which said flow must pass at increased velocity as compared with said other parts of the circuit, and means for moving bulky or irregular articles to be treated into and out of said tunnel, including means cooperating with the tunnel to substantially seal the same as against excessive loss of said medium during the transfer of said bulky or irregular articles.

17. Apparatus for treating foodstuffs, including, in combination, means for refrigerating a gaseous medium, means for setting up a closed-circuit flow of the refrigerated medium, means providing an enclosed elongated tunnel, of restricted cross-sectional area as compared with the rest of the circuit, through which said flow must pass at increased velocity, and continuous traverse conveying means for moving the articles to be treated transversely into, lengthwise through, and transversely out of, said tunnel.

18. Heat transfer apparatus including a continuous closed-circuit conveying system for a fluid medium, means for setting up a current of a treating gaseous medium in said closed-circuit system and flowing the same at high velocity in at least a portion of said system, means for conveying bulky or irregular articles to be treated into and out of said portion of the system, and means cooperating with said last-mentioned means to substantially obviate passage of said current out of the system at points of ingress and egress of the articles.

19. In food treating apparatus of the character described, a loading and unloading chamber, a freezing chamber, a glazing chamber substantially isolated from the freezing chamber, and a closed-circuit foodstuff conveyor system passing serially through said chambers.

20. In treating apparatus of the character described, a loading and unloading zone, a freezing zone, and a warming zone, and a continuous conveyor, for articles to be treated passing, in its traverse, successively through said zones in the order named.

21. In treating apparatus of the character described, a loading and unloading zone, an air freezing zone, and a warming zone, and a continuous conveyor, for articles to be treated passing, in its traverse, successively through said zones in the order named, and air-lock means where the conveyor passes into and out of the freezing zone.

22. In treating apparatus of the character described, a loading and unloading zone, a freezing zone, a glazing zone, another freezing zone, and a warming zone, and a continuous conveyor, for articles to be treated passing, in its traverse, successively through said zones in the order named.

23. In apparatus of the character described, a closed-circuit cold-air freezing system, including a high-speed blower, a freezing tunnel and an air-chilling zone; and a closed-circuit foodstuff conveyor system passing into and out of said tunnel and including horizontally disposed trays carried into and out of the tunnel transversely thereof and positioned to close openings in the latter to prevent escape of air therefrom.

24. In food freezing apparatus, a substantially closed-circuit freezing-air system, comprising a high-speed fan blower, an elongated freezing tunnel connected at one end to the discharge outlet of the blower and having its cross sectional area not greater than approximately the area of the fan outlet whereby to maintain high velocity air-flow over the articles to be frozen therein, and an air-chilling zone of unimpeded cross sectional area at least as great as that of said tunnel with means of connection at one end to the outlet end of the tunnel and of connection at its other end to the inlet of the fan blower.

25. In treating apparatus of the character described, a freezing system through which the articles to be treated are passed, said system comprising a chilling zone or chamber, a glazing zone or chamber, a main freezing zone or chamber, means for conveying the articles to be frozen successively into said zones or chambers in the order mentioned, and a zone or chamber for loading the conveying means with said articles at a point, in the series, prior to said chilling zone or chamber.

26. In treating apparatus of the character described, a freezing system through which the articles to be treated are passed, said system comprising a chilling zone or chamber having means for subjecting the articles to the action of a refrigerated gaseous medium, a glazing zone or chamber wherein the articles are subjected to surface moistening to form ice thereon, a main freezing zone or chamber including means for subjecting the articles to a rapidly moving current of a refrigerated gaseous medium, means for conveying the articles to the frozen successively into said zones or chambers in the order mentioned, and a zone or chamber for loading the conveying means with said articles at a point, in the series, prior to said chilling zone or chamber.

27. In treating apparatus of the character described, a freezing system through which the articles to be treated are passed, said system comprising a chilling zone or chamber having means for subjecting the articles to the action of a refrigerated gaseous medium, a glazing zone or chamber wherein the articles are subjected to surface moistening to form ice thereon, a main freezing zone or chamber including means for subjecting the articles to a rapidly moving current of a refrigerated gaseous medium, means for conveying the articles to be frozen successively into said zones or chambers in the order mentioned, and a zone or chamber for loading the conveying means with said articles at a point, in the series, prior to said chilling zone or chamber, and means for maintaining a substantially constant isolation between at least two of said zones or chambers even when said articles are being transferred in and out of the same.

28. In food freezing mechanism, metallic conveyor means on which the articles are placed in heat transferent contact, a chilling zone through which said conveying means and articles are passed, a glazing zone or chamber in which said conveying means and articles are subjected to the application of moisture for forming an ice coating thereon, and a subsequent main freezing chamber in which said coated conveying means and articles are subjected to the influence of a fluid freezing medium.

29. In food freezing mechanism, metallic conveyor means on which the articles are placed in heat transferent contact, a chilling zone through which said conveying means and articles are passed, a glazing zone or chamber in which said conveying means and articles are subjected to the application of moisture for forming an ice coating thereon, and a subsequent main freezing chamber in which said coated conveying means and articles are subjected to the influence of a fluid freezing medium, and radiating finning on said conveying means.

30. Apparatus for treating foodstuffs including an elongated horizontally extending chamber of relatively small transverse dimensions as compared with the length thereof, means for refrigerating air delivered to said chamber, horizontal support means on which articles to be treated may be placed in heat transferent contact, means for moving the support means into and out of said chamber in a substantially horizontal position, radiating elements on the support means spaced apart transversely of the chamber, means for effecting a high speed relative movement between said refrigerated air and said support means longitudinally of said chamber to effect a freezing operation on said articles and means for maintaining said support means in a substantially horizontal position during the latter operation.

HARRY R. BEARD.